United States Patent [19]

Heidemann

[11] Patent Number: 5,058,102

[45] Date of Patent: Oct. 15, 1991

[54] BROADBAND OPTICAL COMMUNICATION SYSTEM, PARTICULARLY FOR THE SUBSCRIBER AREA

[75] Inventor: Rolf Heidemann, Tamm, Fed. Rep. of Germany

[73] Assignee: Alcatel N. V., Amsterdam, Netherlands

[21] Appl. No.: 471,436

[22] Filed: Jan. 29, 1990

[30] Foreign Application Priority Data

Jan. 31, 1989 [DE] Fed. Rep. of Germany ....... 3902746

[51] Int. Cl.$^5$ .............................................. H04J 14/00
[52] U.S. Cl. ...................................... 359/125; 370/71
[58] Field of Search ............... 455/600, 612, 617, 618, 455/610; 370/3, 121, 71-73, 69.1

[56] References Cited

U.S. PATENT DOCUMENTS 4,532,543 7/1985 Groenewegen ......................... 455/3

OTHER PUBLICATIONS

Handouts from the Society of Cable TV Engineers Meeting of Jan. 18-20, 1988.
Matt, H. J., et al., "Integrated Broad-Band Communication Using Optical Networks—Results of an Experimental Study," *IEEE*, vol. Com.-29, No. 6, Jun. 1981.
Olshansky, R., et al., "60-Channel FM Video Subcarrier Multiplexed Optical Communication System," *Electronics Letters*, 22 Oct. 1987, vol. 23, No. 22.

*Primary Examiner*—Reinhard J. Eisenzopf
*Assistant Examiner*—L. Van Beek
*Attorney, Agent, or Firm*—Christie, Parker & Hale

[57] ABSTRACT

In optical communication systems for transmitting a plurality of broadband signals, particularly television signals, over an optical waveguide, the signals are modulated onto carriers of different frequencies, and the modulated carriers are transmitted as frequency-division-multiplex signals. The carrier frequencies lie in different frequency bands ($B_1$, $B_2$, $B_3$) each of which is not more than one octave wide and which are spaced at least one octave apart. This makes it possible to adapt the system step by step to channel requirements using conventional, proven transmission equipment for the individual frequency bands.

6 Claims, 2 Drawing Sheets

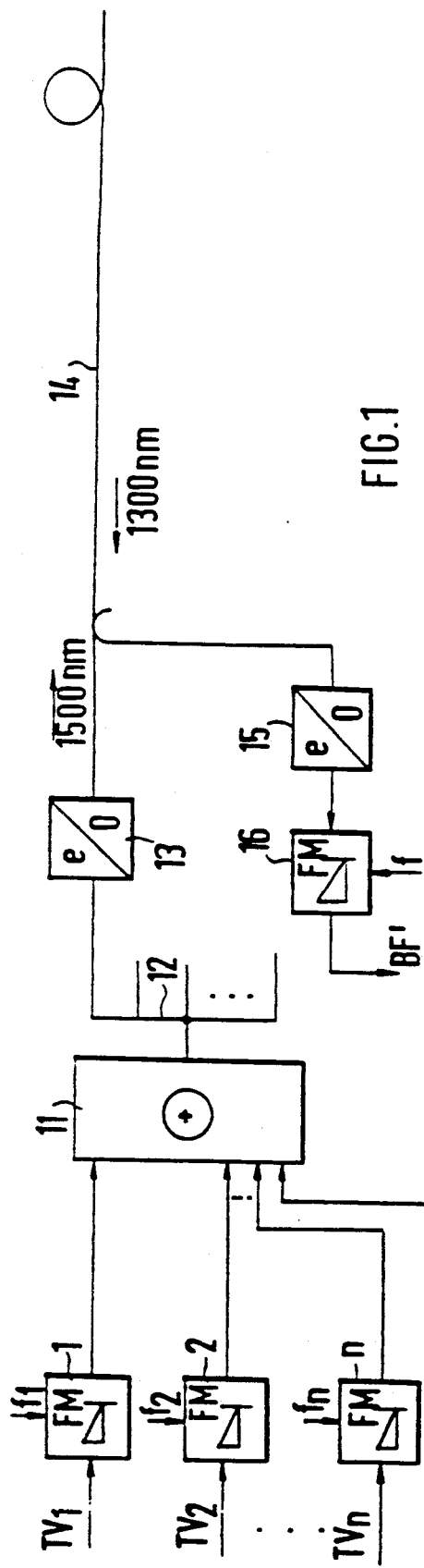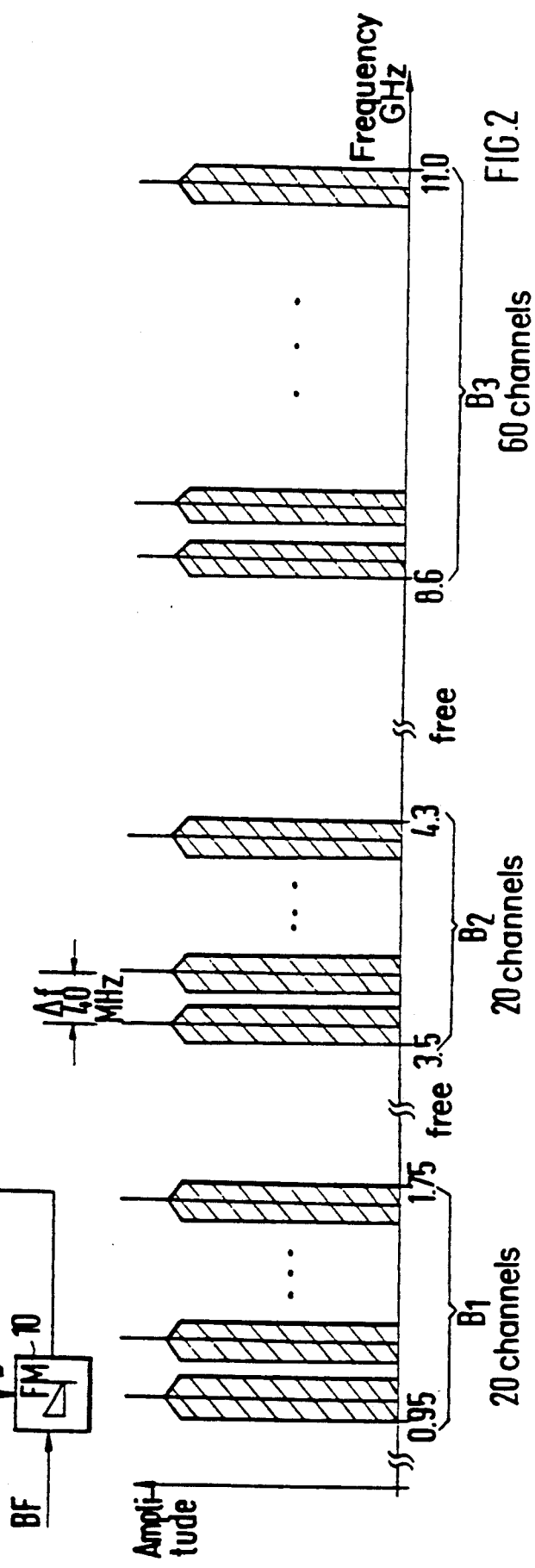

BROADBAND OPTICAL COMMUNICATION SYSTEM, PARTICULARLY FOR THE SUBSCRIBER AREA

TECHNICAL FIELD

The present invention relates to a system for transmitting broadband signals using frequency multiplexed carriers.

CLAIM FOR PRIORITY

This application is based on and claims priority from an application first filed in Fed. Rep. Germany on 31 Jan. 1989 under serial number 39 01 746.5. To the extent such prior application may contain any additional information that might be of any assistance in the use and understanding of the invention claimed herein, it is hereby incorporated by reference.

BACKGROUND ART

A typical prior art frequency multiplexed broadband transmission system is described in "Electronics Letters" 22nd Oct. 1987, Vol. 23, No. 22, pages 1196 to 1198.

In all examples described there, the carrier frequencies used are in a single, continuous frequency band which i snot more than one octave wide and lies in a frequency range which is the higher the more signals have to be transmitted. If, for example, only four signals have to be transmitted, the carriers will lie in a frequency band extending from 150 to 300 MHz, and if 60 signals have to be transmitted, the 60 carriers will lie in a frequency band from 2.7 to 5.2 GHz. This frequency allocation corresponds to a frequency allocation which is known from "IEEE Transactions and Communications", Vol. COM-29, No. 6, June 1981, pages 868 to 885, especially FIG. 13 on page 878. The modulation there is amplitude modulation, and the carrier frequencies lie within a single octave in a frequency band from 54 to 108 MHz.

The conventional manner of choosing carrier frequencies is disadvantageous in that if a great number of signals have to be transmitted, only frequency bands in the high frequency range range, e.g., the GHz range, can be used, so that frequencies in lower ranges, in which signal processing can also be performed by simpler means, will not be used.

DISCLOSURE OF INVENTION

It is, therefore, the object of the invention to provide a system of the kind referred above in which the carrier frequencies are chosen in a different manner than in the prior art systems.

In accordance with the invention, the carrier frequencies lie in different frequency bands each of which is not more than one octave wide and which are spaced at least one octave apart. This makes it possible to adapt the system step by step to channel requirements using conventional, proven transmission equipment for the individual frequency bands.

BRIEF DESCRIPTION OF DRAWINGS

The invention will now be explained, by way of example with reference to the accompanying drawings, in which:

FIG. 1 shows a modulation and multiplexing facility for the center of a cable television distribution network;

FIG. 2 shows the frequency allocation plan for the system in accordance with the invention.

BEST MODE FOR CARRYING OUT THE INVENTION

Figure 3:
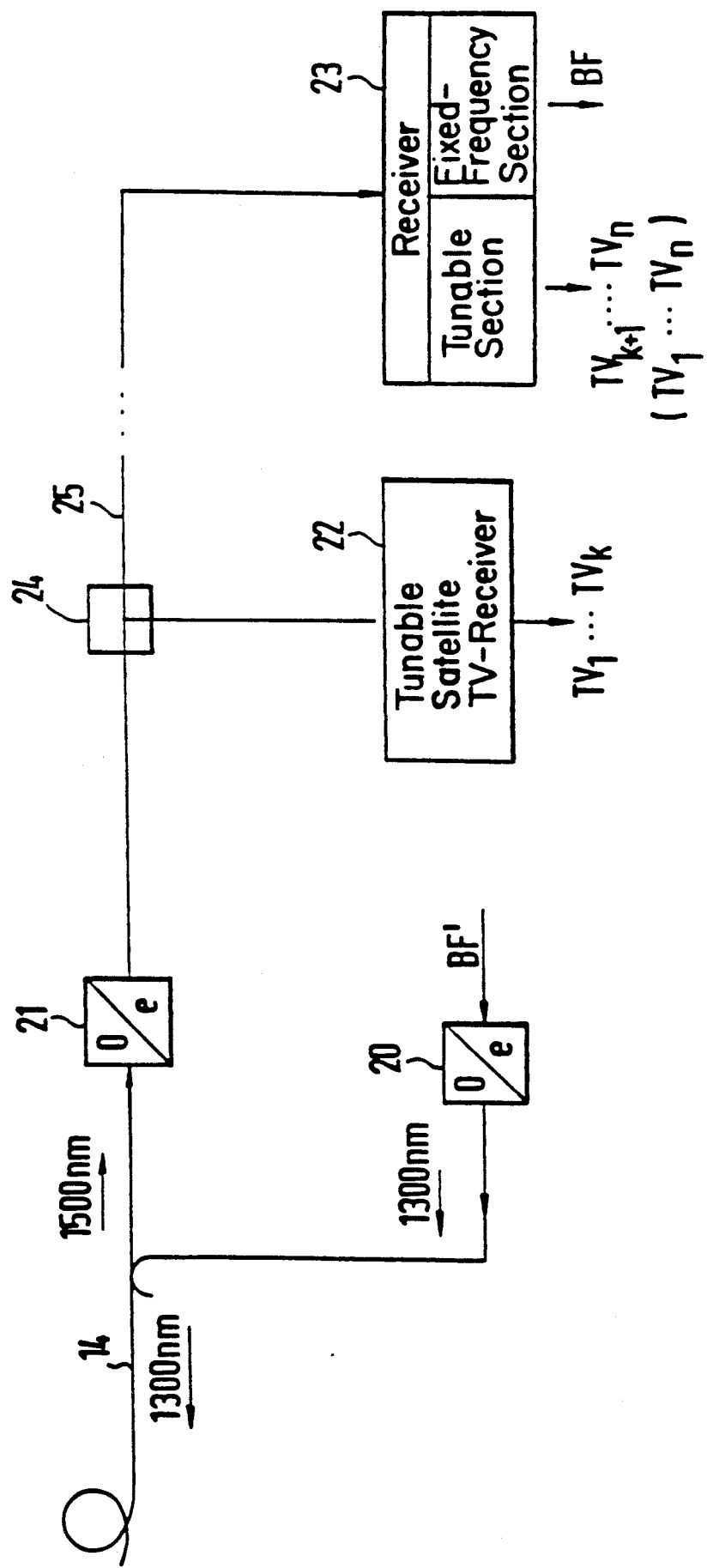
FIG. 3 shows that facility in the opposite station, i.e., at a subscriber of the cable television network, which cooperates with the facility of FIG. 1.

The invention will be explained as applied to a cable television distribution network, but it is to be understood that it can also be applied wherever a plurality of broadband or digital signals have to be transmitted from a point A to one or more points B.

From a head end (not shown), also referred to as "CATV center", a number of television signals, e.g., 36 television signals, $TV_1$ to $TV_n$ are fed at baseband into the modulation and multiplexing facility of FIG. 1. The term "television signal" as used in the following means a composite signal containing the composite color signal and the television sound signal. It has a bandwidth of about 6 MHz.

The term also covers a high-resolution television signal, generally referred to as HDTV signal (HDTV = High Definition Television). This signal has a much greater bandwidth, e.g., 20 MHz, than an ordinary television signal.

Each of the television signals $TV_1$ to $TV_n$ is fed into the modulation input of a frequency modulator, where it is frequency modulated onto a carrier. The frequency modulators are designated by the reference characters n, and the carrier frequencies by $f_1$ to $f_n$.

If there are also video-telephone signals to be transmitted from this center to the subscribers, in the simplest case, they will be frequency-modulated as analog signals onto a carrier in the same manner as the television signals. In the example of FIG. 1, a video-telephone signal BF is applied to a frequency modulator 10, which is fed with a carrier frequency $f_b$. A video-telephone signal is thus treated in the same manner as a television signal.

The frequency-modulated carriers appearing at the outputs of the modulators are combined into a frequency-division multiplex (FDM) signal in a power combiner 11. The FDM signal is then distributed by a power distributor 12 to several lines, because it is to be applied to several transmission links leading to different subscribers or groups of subscribers. Such a transmission link which leads to a subscriber or a group of subscribers is indicated in FIG. 1 by additional devices. These include an electric-to-optical transducer 13, which converts the FDM signal into an optical signal by intensity-modulating a laser incorporated therein which has an operating wavelength of, e.g., 1500 nm. This optical signal is transmitted over an optical waveguide 14 to a subscriber or a group of subscribers.

A video-telephone signal may also be sent from the subscriber to the center. In the example shown, this is an optical signal of a second wavelength, namely 1300 nm. At the center, this optical signal is coupled out of the optical waveguide 14, converted into an electric signal in an optical-to-electric transducer, and subsequently demodulated in a frequency demodulator 16, so that the output of the latter provides an analog video-telephone signal BF' at baseband. The frequency of the carrier to be injected into the demodulator 16 is designated f. A video-telephone signal is thus sent from a subscriber to the center by frequency-modulating this signal onto a carrier of frequency f, converting the modulated carrier signal into an optical signal having a second wavelength of 1300 nm, and transmitting this optical signal to the center over the same optical waveguide 14 which serves to transmit television signals from the center to the subscriber.

The frequency assignment of the carriers used for transmission from the center to the subscribers, sometimes also referred to in the literature as "subcarriers", will now be explained with the aid of FIG. 2.

A first frequency band from 0.95 to 1.75 GHz includes up to 20 carrier frequencies spaced at least $\Delta f=40$ MHz apart. This frequency band is thus used to transmit signals from 20 broadband channels (television or video-telephone channels). Referred to its lowest frequency, this frequency band is thus less than one octave wide, so that intermodulation products will have frequencies lying outside this frequency band. The dominant intermodulation products lie in the "adjacent" octave.

For the processing of modulated-carriers whose frequencies lie in this 0.95- to 1.75-GHz band, the modulators and demodulators used in satellite communication systems are available; in particular, commercially available satellite TV receivers can be used. In a first phase of the introduction of cable television over optical waveguides, a transmission capacity of 20 broadband channels can thus be provided using low-cost transmission components and equipment.

If, e.g., in a later phase of the introduction, the transmission capacity is to be increased to more than 20 channels, according to the invention, further carrier frequencies are used which lie in a band from 3.5 to 4.3 GHz. In this band, too, there may be up to 20 carrier frequencies separated by the same distance as in the first frequency band, i.e., through the use of this second frequency band, a total transmission capacity of 40 channels is available.

Referred to its lower frequency of 3.5 GHz, this second frequency band, too, is less than one octave wide, and between the first and second frequency bands, there is an unused space which is at least one octave wide, so that any intermodulation products from the first frequency band will not coincide in frequency with any further carriers from the second frequency band.

A third frequency band, extending from 8.6 to 11.0 GHz, may contain another 60 carrier frequencies, thus offering transmission capacity for 60 broadband channels. Referred to its lower frequency of 8.6 GHz, this third frequency band, too, is not more than one octave wide, and it is separated from the upper frequency of the second frequency band, i.e., 4.3 GHz, by at least one octave.

The reason for the widths of the frequency bands and the intervening unused frequency ranges are the intermodulation products caused during the modulation of the carriers. These intermodulation products must not interfere with the carriers used. This makes it easier to achieve the required signal-to-noise ratio. The division into the various bands also permits step-by-step adaptation to channel requirements from 20 to 40 and to 100 channels by adding the transmission equipment designed for the respective frequency band.

A greater number of channels is required, for example, if several communication services are to be introduced. The system described thus allows several services to be introduced step by step, e.g., transmission of a first set of television programs, transmission of a second set of television programs, video telephony, and HDTV.

A second reason for the widths of the frequency bands is the fact that transmission units like RF amplifiers, power dividers, power combiners, optical transmitters, optical receivers, and FM receivers can be implemented at especially low cost and in a particularly elegant manner if their bandwidths need not be greater than one octave.

A large part of the carrier frequencies of the second frequency band lies in the so-called C-band, so that transmission equipment designed for the C-band, e.g., commercially available satellite C-band converters, can be used for processing these frequencies. The majority of the carrier frequencies of the third band lies in the X-band, so that they, too, can be processed with customary equipment, such as X-band converters.

The carrier frequencies of the second and third frequency bands lying in the C- and X-bands, respectively, are preferably used for transmitting the above-mentioned HDTV signals. Since HDTV signals have a greater bandwidth than ordinary television signals, a correspondingly greater distance from adjacent carrier frequencies is then necessary.

The facility at the subscriber end which cooperates with the facility of FIG. 1 will now be explained with the aid of FIG. 3.

The subscriber facility of FIG. 3 receives an optical signal with a wavelength of 1500 nm, which contains broadband signals, e.g., television signals, over the optical waveguide 14, as was explained above in connection with FIG. 1. An optical-to-electric transducer 21 converts this optical signal into an electric signal. If the latter contains only modulated carriers with frequencies in the first frequency band from 0.95 to 1.75 GHz, it is fed into an FM microwave receiver, e.g., a commercially available satellite TV receiver 22, which is tunable and provides at its output any one of the transmitted television signals $TV_1$ to $TV_k$ for the television receiver.

If the received signal carries not only modulated carriers with frequencies from the first frequency band but also modulated carriers from the other frequency bands, and the subscriber wants to receive these, the satellite TV receiver will not be sufficient. In that case, the received signal can be applied to an additional receiver 23, e.g., a satellite TV receiver preceded by a satellite C-band converter, which permits the reception of further signals. If the subscriber wants to make use of the video-telephone service, his receiver 23 may have, in addition be to a tunable section, a fixed-frequency section which is preset to the carrier frequency used for transmitting the video-telephone signal and delivers the video-telephone signal BF. The tunable section may be designed either to process only the signals not processable by the satellite TV receiver or to receive all signals with carrier frequencies from all three frequency bands. In the latter case, the receiver 23 would be a genuine universal receiver.

In the embodiment of FIG. 3, the received signal is distributed to the satellite TV receiver 22 and a line 25 by means of a power divider 24, the satellite TV receiver 22 being suitable for receiving television signals $TV_1$ to $TV_k$ from the first frequency band, and the line 25 being connectable to the receiver 23, which is suitable for receiving the remaining television signals $TV_{k+1}$ to $TV_n$ and the video-telephone signal.

This shows that the frequency allocation plan of the system according to the invention has the advantage, also with respect to the usable receivers, that step-by-step adaptation to channel requirements or step-by-step subscription to different communication services is possible. It is also possible, of course, to connect a universal receiver as a single receiver, i.e., without the use of a satellite TV receiver, to the output of the optical-to-electric transducer 21 and use it for receiving all television signals $TV_1$ to $TV_n$ from all frequency bands.

Also, the power divider 24 may be provided with a frequency-separating filter, so that in the presence of two or more receivers, preselection can be performed to ensure that one of the receivers can receive only part of the transmitted signals, e.g., to distinguish between the services "ordinary television" and "HDTV" or between the services "ordinary television" and "pay TV".

An essential advantage for the subscribers lies in the fact that they have the option of operating either highly or less sophisticated receivers depending on the number of communication services they wish to subscribe to.

If the subscriber wants to subscribe to the video-telephone service, i.e, a broadband service, the facility at the subscriber end includes an electric-to-optical transducer 20, which converts a video-telephone signal coming from a video-telephone terminal (not shown) into an optical signal with a wavelength of, e.g., 1300 nm, which is coupled into the optical wave-14 connecting the subscriber facility to the facility at the center, shown in FIG. 1.

Finally, it should be pointed out that instead of the above-described transmission of analog signals by frequency modulation, the signals can also be transmitted as digital signals, in which case it is advantageous to use phase-shift keying instead of frequency modulation. The video-telephone signals can also be transmitted in a manner different from that described, e.g., as digital PCM signals.

I claim:

1. System for optically transmitting a plurality of different broadband signals, the system comprising
   a plurality of modulators which respectively modulate each of said broadband signals onto a corresponding carrier frequency within a corresponding one of at least two different carrier frequency bands wherein each said carrier frequency band is not more than one octave wide and is at least one octave apart from all the other said carrier frequency bands, and
   a ;combiner circuit which combines all said carrier frequencies in all said carrier frequency bands into a single frequency-multiplexed signal to be transmitted.

2. A system as claimed in claim 1, wherein a first said carrier frequency band is 0.95 to 1.75 GHz, a second said carrier frequency band is 3.5 to 4.3 GHz, and a third said carrier frequency band is 8.6 to 11.0 GHz.

3. A system as claimed in claim 1, wherein the carrier frequencies in the carrier frequency bands are spaced at least 40 MHz apart.

4. A system as claimed in claim 1, wherein
   the broadband signals include video-telephone signals and other broadband signals, and
   both the video-telephone signals and the other broadband signals are frequency modulated on their respective carrier frequencies.

5. A system as claimed in claim 1, wherein
   the broadband signals include a predetermined type of digital data signals and other broadband signals, and
   at least the predetermined type of digital data signals i modulated on a first group of said carrier frequencies lying in a first said carrier frequency band.

6. A system as claimed in claim 1, wherein in a first direction of transmission, a predetermined type of broadband signals are transmitted over an optical waveguide using a first wavelength, and in the opposite direction of transmission, said predetermined type of signals are transmitted over the same optical waveguide using a second wavelength.

* * * * *

UNITED STATES PATENT AND TRADEMARK OFFICE
CERTIFICATE OF CORRECTION

PATENT NO. : 5,058,102
DATED : October 15, 1991
INVENTOR(S) : Rolf Heidemann It is certified that error appears in the above-identified patent and that said Letters Patent is hereby corrected as shown below:

Column 1, line 27, after "which" change "i snot" to -- is not --.
Column 1, line 45, delete "range" (second occurrence).
Column 1, line 52, after "referred" insert -- to --.

Column 4, line 14, after "majority" insert -- of --.
Column 4, line 51, after "addition" delete -- be --.

Column 5, line 30, change "wave-14" to -- waveguide 14 --.

Column 6, line 11, before "combiner" delete the ";".
Column 6, line 33, before "modulated" change "i" to -- is --.

Signed and Sealed this

Twenty-third Day of November, 1993

Attest:

BRUCE LEHMAN

*Attesting Officer*      Commissioner of Patents and Trademarks